(12) United States Patent
Bali

(10) Patent No.: US 7,779,137 B1
(45) Date of Patent: Aug. 17, 2010

(54) IP ALIASING AND ADDRESS RESOLUTION USING A FIBRE CHANNEL (FC) FABRIC NAME SERVER

(75) Inventor: Naveen Bali, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1675 days.

(21) Appl. No.: 10/692,670

(22) Filed: Oct. 24, 2003

(51) Int. Cl.
*G06F 15/16* (2006.01)
(52) U.S. Cl. ......................... 709/230; 709/200; 709/224
(58) Field of Classification Search ................. 709/230, 709/200
See application file for complete search history.

(56) References Cited

U.S. PATENT DOCUMENTS

| | | | |
|---|---|---|---|
| 7,055,056 B2* | 5/2006 | Bessire | 714/6 |
| 7,362,717 B1* | 4/2008 | Betker | 370/254 |
| 2002/0191649 A1* | 12/2002 | Woodring | 370/906 |
| 2003/0091037 A1* | 5/2003 | Latif et al. | 370/355 |
| 2003/0093523 A1* | 5/2003 | Cranor et al. | 709/225 |

OTHER PUBLICATIONS

Kumar Malavalli et al., "Fibre Channel Generic Service-3 (FC-GS-3)", NCITS working draft proposed American National Standard for Information Technology, Jan. 13, 2000.*

* cited by examiner

*Primary Examiner*—Yves Dalencourt
*Assistant Examiner*—Michael C Lai
(74) *Attorney, Agent, or Firm*—Blakely, Sokoloff, Taylor & Zafman LLP

(57) ABSTRACT

In one embodiment, a method for building a failover-enabled communications systems is provided. The method comprises clustering a plurality of Fiber Channel (FC) node devices to form a failover cluster. A primary link is established between a first FC node device in the failover cluster and a FC node device outside the failover cluster. In the event of failure of the primary link, a backup link is established between the FC node device outside the failover cluster and a second FC node device in the failover cluster.

17 Claims, 13 Drawing Sheets

NSDB TABLE

| Port ID | Symbolic Name | Port Name | Protocol |
|---------|---------------|-----------|----------|
| HEX 101 | Symbolic name for Storage Device 102 | HEX 1002 | FCVI |
| HEX 102 | Symbolic name for Storage Device 104 | HEX 2004 | FCVI |
| HEX 103 | Symbolic name for Storage Device 106 | HEX 3002 | FCVI |
|  |  |  |  |

FIGURE 5

FC Commands

IP ALIASING AND ADDRESS RESOLUTION USING A FIBRE CHANNEL (FC) FABRIC NAME SERVER

FIELD OF THE INVENTION

This invention relates to the storage of data. In particular, the invention relates to the storage of data using storage components connected by links that support the Fibre Channel (FC) protocol.

BACKGROUND

The Fibre Channel (FC) protocol enables high-speed point-to-point communications between storage devices through an intelligent collection of switches called a fabric. The storage devices may have one or more node devices called N_Ports which connect directly with ports on the fabric called Fabric Ports (F_Ports). The N_Ports discover each other through the fabric. Any two N_Ports may establish a link by a direct login procedure or a fabric login procedure. Each link is capable of supporting a base level protocol (the FC protocol) as well as one or more upper-level protocols (ULPs) such as the Small Computer Systems Interface (SCSI), the Ethernet Internet Protocol (IP), the Virtual Interface (VI) architecture (FCVI), etc. When running a ULP such as VI, a ULP connection must be established between a pair of ULP N_Ports before communications between the N_Ports can occur.

In many applications, it would be desirable to have multiple N_Ports in a cluster-failover configuration. However, the FC protocol is not well suited to such a configuration. In particular, a ULP port, e.g., a FCVI port (hereinafter called the "source port") must discover the port identifier (ID) of the corresponding FCVI port (hereinafter called the "login port") to which it wishes to send a connection request. This is achieved by querying a name server for the fabric to determine the IP address of the login port or by issuing a FARP (Fabric Address Resolution Protocol) request to all ports on the fabric. However, the name server can only associate one IP address per port. Thus, it is not possible to perform a failover cluster by allowing ports to have multiple associated IP addresses or IP aliases stored in the name server.

If a FARP request is the mechanism used to discover the port ID of the login port, then the source port issues a FARP request to all ports on the fabric. The FARP request includes the IP address of the login port. Each port on the fabric receives the FARP request and compares the IP address therein with its own IP address. Only the port with a matching IP address responds to the FARP request by providing its port ID to the source port.

Even if a port were to be assigned multiple IP addresses, the discovery procedure using a FARP request as described above would not be useful in discovering a failover partner node since each N_Port is configured to check if the IP address in an incoming FARP request matches a single IP address stored in the N_Port. Moreover, as defined in the FC protocol, the FARP request is an optional service, and is not supported by all manufacturers.

Thus, there is a need for a mechanism that allows N_Ports to have IP aliases so that the N_Ports may be clustered together as failover partners. There is also a need for a mechanism that allows a failover partner to assume the identity of a failed failover partner in a seamless fashion.

SUMMARY OF THE INVENTION

The invention includes a method for building a failover-enabled communications systems. In one embodiment, the method comprises clustering a plurality of Fibre Channel (FC) node devices to form a failover cluster. A primary link is established between a first FC node device in the failover cluster and a FC node device outside the failover cluster. In the event of failure of the primary link, a backup link is established between the FC node device outside the failover cluster and a second FC node device in the failover cluster.

The invention also provides a method for building a failover-enabled communications system. The method comprises establishing a primary link between a first FC node device and a second FC node device and configuring a third FC node device to act as a failover node for the second FC node device. The third FC node device is assigned an upper-level protocol alias address that corresponds to an upper-level protocol address of the second FC node device. Upon a failure of the primary link, a backup link is established with the third FC node device.

Other aspects of the invention will be apparent from the accompanying figures and from the detailed description which follows.

BRIEF DESCRIPTION OF THE DRAWINGS

FIG. 5 shows a table implemented within a name server for the Fibre Channel (FC) fabrics of FIGS. 1A and 1B, in accordance with one embodiment of the invention;

DETAILED DESCRIPTION

The techniques described herein are applicable to any communications system that supports the Fibre Channel (FC) protocol at a base layer and an upper-level protocol at a layer above the base layer. Thus, aspects of the present invention broadly include a method of addressing communications between components of such a communication system using an upper-level addressing scheme supported by the upper-level protocol, wherein the method comprises assigning multiple upper-level addresses based on the upper-level protocol to a FC node in the communications system; and configuring each FC node in the communication system to resolve an upper-level address into an address based on the FC protocol.

The invention applies broadly to any storage solution that uses the Fibre Channel (FC) protocol. Thus, for example, in addition to Storage Area Networks (SANs), the invention also applies to Network Attached Storage (NAS) devices.

In one embodiment, the invention provides a technique to associate multiple Upper-level Protocol (ULP) addresses, for example IP addresses, to an N_Port, as defined in the FC protocol. This allows a network administrator to cluster or group together a plurality of N_Ports to form a failover cluster.

In another embodiment the invention provides a technique that allows a failover partner within a network that supports the FC protocol to assume the identity of a failed failover partner within the failover cluster in a seamless fashion. Other advantages of the invention will become apparent from the description below.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
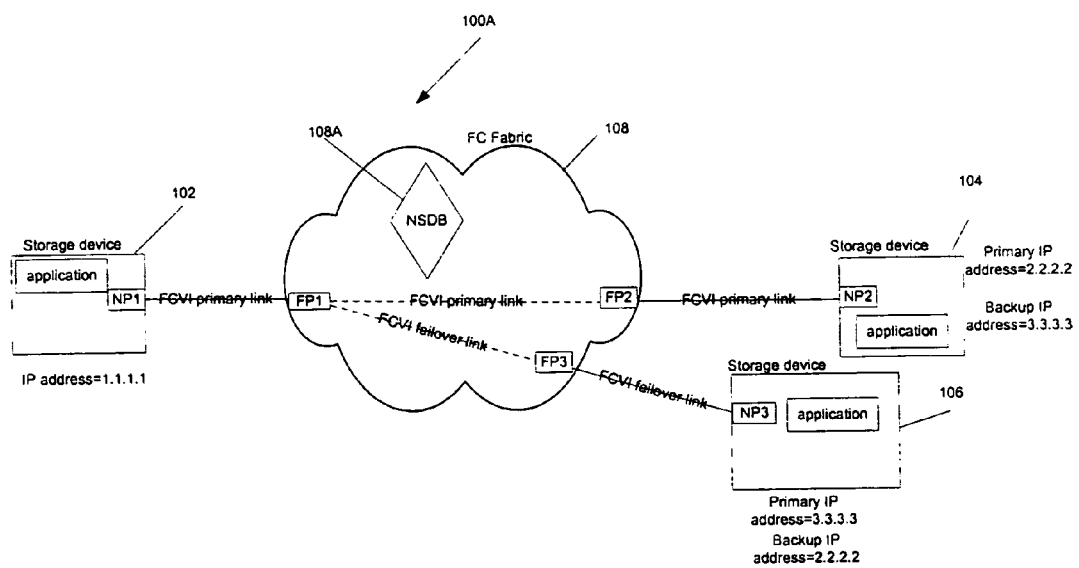
FIGS. 1A and 1B show high-level block diagrams of a storage area network, within which embodiments of the present invention may be practiced.

FIG. 1A of the drawings shows a block diagram of a Storage Area Network (SAN) 100A within which embodiments of the present invention may be practiced. The SAN 100A includes storage devices 102, 104, and 106, which are connected by a Fibre Channel (FC) fabric 106. Each of the storage devices 102 to 106 includes an N_Port designated NP1, NP2, and NP3, respectively. Each of the N_Ports are under control of an application that supports an upper-level protocol (ULP) addressing scheme such as SCSI or FCVI. For the remainder of the description, it is assumed that the applications within the storage devices 102 to 106, each support the FCVI protocol. Each of the N_Ports, NP1 through NP3 supports a base or low-level protocol in the form of the FC protocol. In accordance with one embodiment of the invention, the storage devices 102 to 106 may be assigned multiple ULP addresses e.g., IP addresses. For example, the storage device 102 may be assigned the IP address 1.1.1.1, the storage device 104 may be assigned the IP address 2.2.2.2 as a primary IP address, and the IP address 3.3.3.3 as a backup IP address, and storage device 106 may be assigned the IP address 3.3.3.3 as a primary IP address, and the IP address 2.2.2.2 as a backup IP address.

The FC fabric includes a name server database (NSDB) within a name server 108A and F_Ports FP1 to FP3. As will be described in greater detail below, a primary FCVI link is established between the storage devices 102 and 104 using the ports NP1 and NP2, and a failover FCVI link is established between the storage device 102 and storage device 106 using the ports NP1 and NP3.

Figure 2:
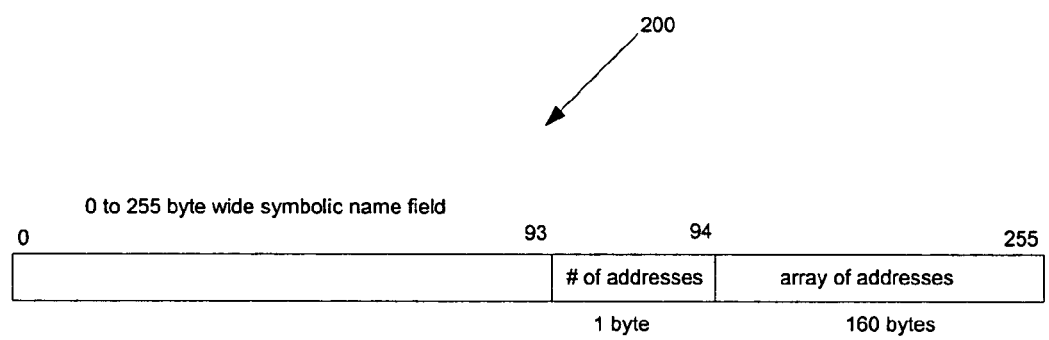
FIG. 2 shows the format of a symbolic name encoded with multiple upper-level protocol addresses, in accordance with one embodiment of the present invention.

In one embodiment, the present invention provides an encoding scheme to encode the multiple IP addresses assigned to the storage device 104 and 106 within a symbolic name for the storage device, as defined in the FC protocol. The FC protocol defines the symbolic name as a 0 to 255 byte-wide string, which may be used to assign a human-readable name to a port identifier. In accordance with one embodiment of the encoding scheme of the present invention, predefined bits of the symbolic name field are used to store the multiple IP addresses. FIG. 2 of the drawings shows an example of an encoding scheme that may be used to encode multiple IP addresses within the symbolic name field. Referring to FIG. 2, it will be seen that byte 93 of the 255 byte-wide symbolic name 200 is used to hold the number of IP addresses assigned to the storage device corresponding to the symbolic name 200. Further, it will be seen that the bytes 94 to 255 are used to store an array of the IP addresses assigned to the storage device.

Figure 3:
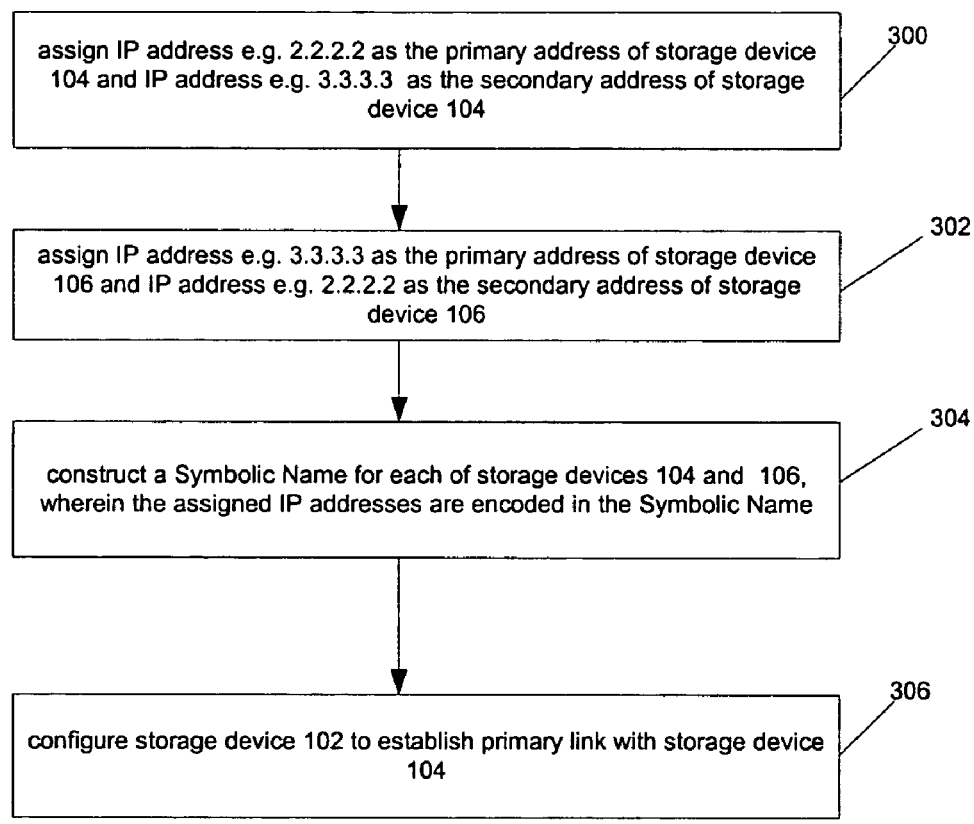
FIG. 3 shows a flow chart of operations performed by a network administrator in accordance with one embodiment of the invention.

Referring now to FIG. 3 of the drawings, the operations performed when configuring the storage devices 102, 104, and 106 in accordance with one embodiment of the present invention are shown. Starting at block 300, a network administrator assigns e.g., the IP address 2.2.2.2 as the primary IP address of the storage device 104 and e.g., the IP address 3.3.3.3 as the secondary address of the storage device 104. Thereafter, at block 302, a network administrator assigns e.g., the IP address 3.3.3.3 as the primary address of the storage device 106 and e.g., the IP address 2.2.2.2 as the secondary address of the storage device 106. At 304, a symbolic name for each of the storage devices 104 and 106 in accordance with the above-described encoding scheme is constructed. The operation 304 may be performed by software running on the storage devices 104 and 106. At 306, the network administrator configures the storage device 102 to establish a primary link with a connection partner i.e., the storage device 104. This involves providing the primary address e.g., 2.2.2.2 of the storage device 104 within a configuration file for the storage device 102 to indicate to the storage device 102 that a primary FCVI link is to be established with the port that is assigned the primary IP address e.g., 2.2.2.2.

Figure 4:
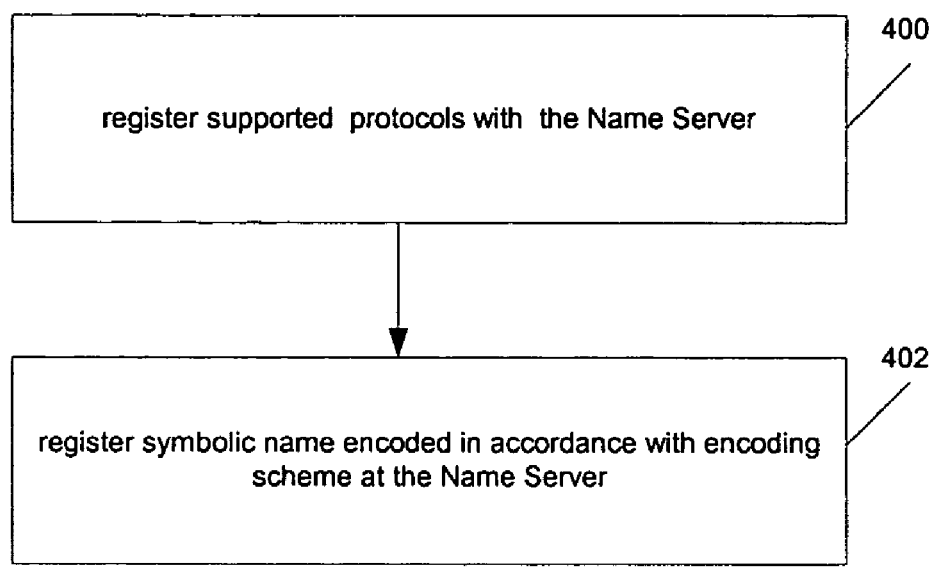
FIG. 4 shows a flow chart of a registration procedure performed by the storage devices of FIG. 1, in accordance with one embodiment of the invention.

Referring now to FIG. 4 of the drawings, there is shown a registration procedure which is performed by each of the storage devices 104 to 106. As will be seen, starting at 400, each of the storage devices 102 to 106 registers the protocols that it supports with the name server 108A. For purposes of the present description, it is assumed that all the storage devices 102 to 106 support the FCVI protocol. Thus at 400, each of the storage devices 102 to 106 registers the FCVI protocol as a supported protocol with the name server. Thereafter at 402, each of the storage devices 102 to 106 registers its assigned symbolic name with the name server. The assigned symbolic name for the storage devices 104 and 106 is encoded with the multiple IP addresses assigned to these storage devices, in accordance with the above-described encoding scheme.

As a result of the registration procedure shown in FIG. 4 of the drawings, the name server database includes a table such as the Table 500 shown in FIG. 5 of the drawings. Referring to FIG. 5, it will be seen that the Table 500 includes a port identifier (ID) column 500A, a symbolic name column 500B, and a supported protocol column 500C.

Figure 6:
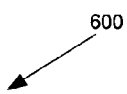
FIG. 6 shows a table of Fibre Channel commands, that may be used in accordance with one embodiment of the present invention.

Referring now to FIG. 6 of the drawings there is shown a Table 600 of FC commands that may be used to perform aspects of the present invention. In order to perform the operation 400 shown in FIG. 4 of the drawings to register the supported protocols with the name server 108A, each of the storage devices 102 to 106 issues the Register FC-4 types (RFT_ID) command to the name server 108. Further, in order to perform the operation 402 to register the symbolic names, each of the storage devices 102 to 106 issues the register symbolic port name command (RSPN_ID) to the name server 108.

Figure 7A:
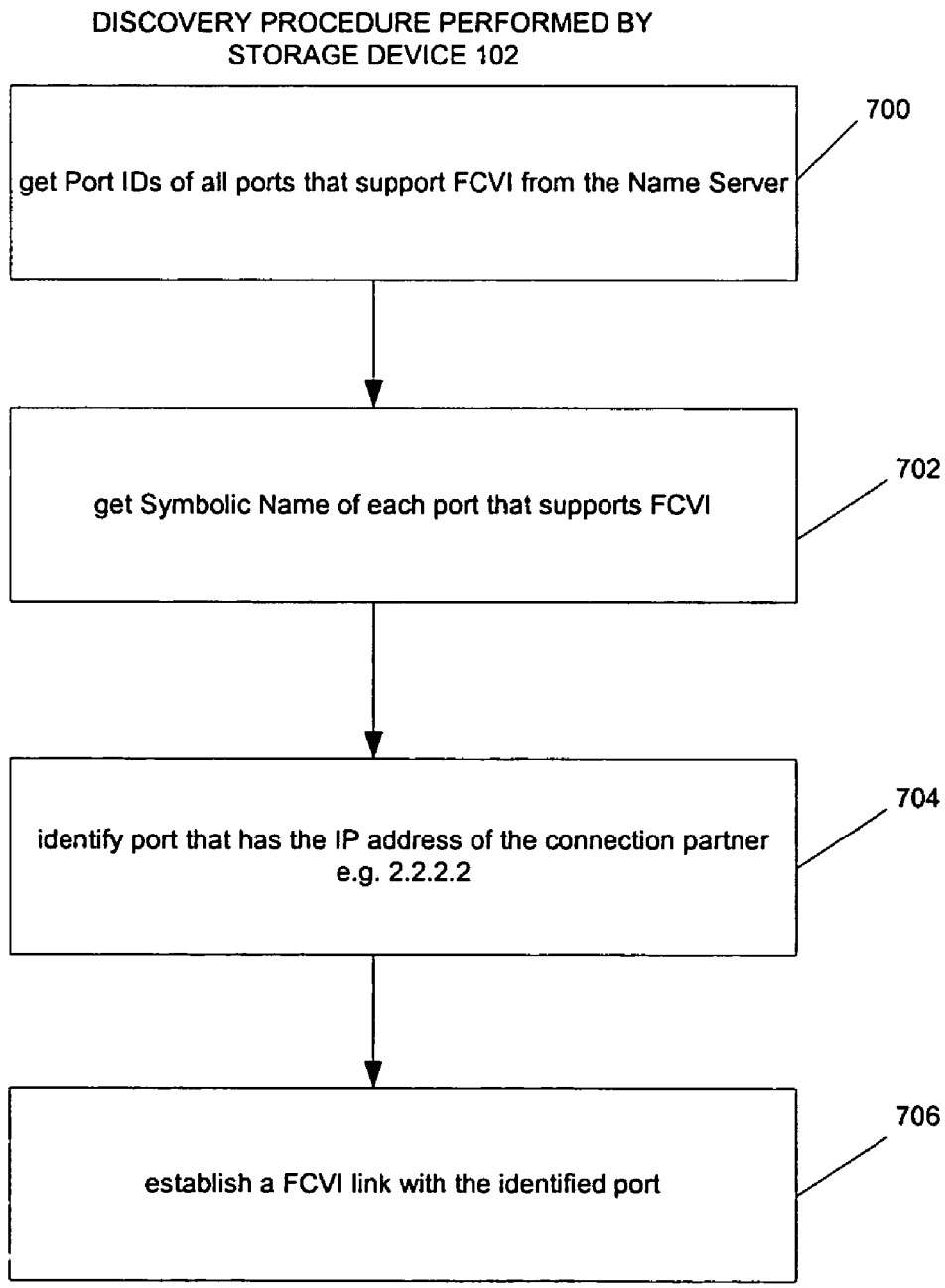
FIGS. 7A and 7B show flow charts of discovery procedures performed by the storage device 102 shown in FIG. 1 of the drawings, in accordance with one embodiment of the invention.

Referring now to FIG. 7A of the drawings, there is shown a discovery procedure which is performed by the storage device 102 in accordance with one embodiment of the invention. Referring to FIG. 7A at 700 the storage device 102 gets the port ID's of all ports that support the FCVI protocol from the name server 108. The operation at 700 is achieved by issuing the Get Port Identifier (GID_FT) command shown in FIG. 6 of the drawings to the name server 108. Thereafter at 702B, the storage device 102 determines a symbolic name of each port that supports FCVI protocol. This operation is achieved by the Get Symbolic Port Name (GSPN_ID) command shown in FIG. 6, which is issued by the storage device 102 to the name server 108. At 704, the storage device 102 identifies the port that has been assigned the IP address of its connection partner, i.e., the IP address 2.2.2.2. In performing the operation 704 the storage device 102 extracts the various IP addresses encoded in the symbolic name of each port and compares it with the IP address 2.2.2.2. If there is a match, then the identity of the port associated with the IP address 2.2.2.2 is identified by its port ID. Thereafter at block 706, the storage device 102 establishes an FCVI link with the identified port, i.e., the port NP2 of the storage device 104, by performing a port login with the identified port.

Figure 7B:
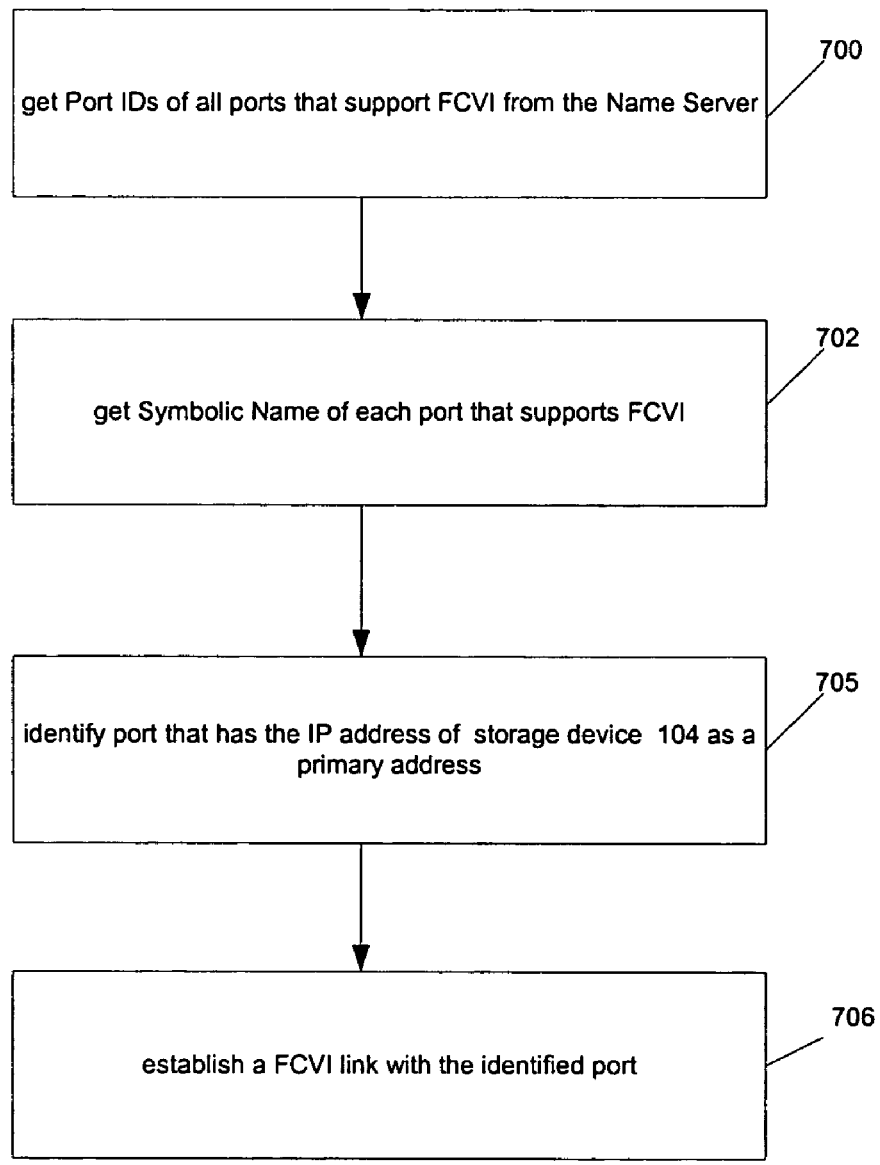

FIG. 7B of the drawings shows an alternative discovery procedure performed by the storage device 102. The alternative discovery procedure includes the operations 700, 702, and 706, which have been described with reference to FIG. 7A of the drawings. However, instead of the operation 704, the alternative discovery procedure now includes the operation 705. The operation 705 involves identifying the port that has the IP address of the storage device 104 as its primary IP address. For example, in one embodiment, the encoding scheme to encode the IP addresses within the symbolic name field may include a protocol to determine whether an IP address is a primary address or a backup address based on its position within the symbolic name field. For example, the first IP address in the symbolic name field may, by protocol, be taken to be the primary address. Thus, an if an IP address is encoded as the first IP address within the array of IP addresses (see FIG. 2 of the drawings) then that IP address would be determined to be the primary IP address. The significance of the alternative discovery procedure shown in FIG. 4 of the drawings will become apparent from the description below.

Figure 8:
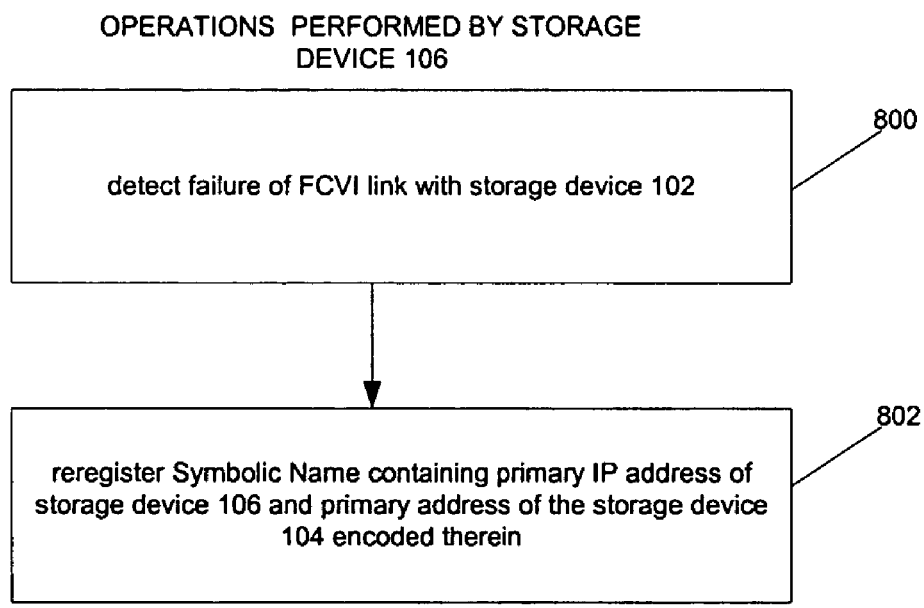
FIG. 8 shows a flow chart of operations performed by the storage device 106 before link failure, in accordance with one embodiment of the invention.

FIG. 8 of the drawings shows the operations performed by the storage device 106 in accordance with one embodiment of the invention after failure of the primary FCVI link between the ports NP1 and NP2 occurs. As will be seen, at block 800, the storage device 106 detects the failure of the FCVI link between the nodes NP1 and NP2. This may be achieved, in one embodiment, by receiving an event notification from the name server 108A and querying the name server 108A to establish if any ports previously seen on the fabric no longer appear to be on the fabric. In another embodiment, there may be a private point-to-point link established between the storage device 106 and the storage device 104, independently of the FC fabric 108, which private link may be used by the storage device 104 to send a message to the storage device 106 to inform the storage device 106 of the failure of the FCVI primary link between the nodes NP1 and NP2. At block 802, in response to detecting the failure of the FCVI link at block 100, the storage device 106, re-registers its symbolic name with the name server 108A. However, the re-registered symbolic name now contains in addition to the primary IP address of the node NP3 of the storage device 106, the primary address 2.2.2.2 of the storage device 104 encoded within the symbolic name.

Figure 9A:
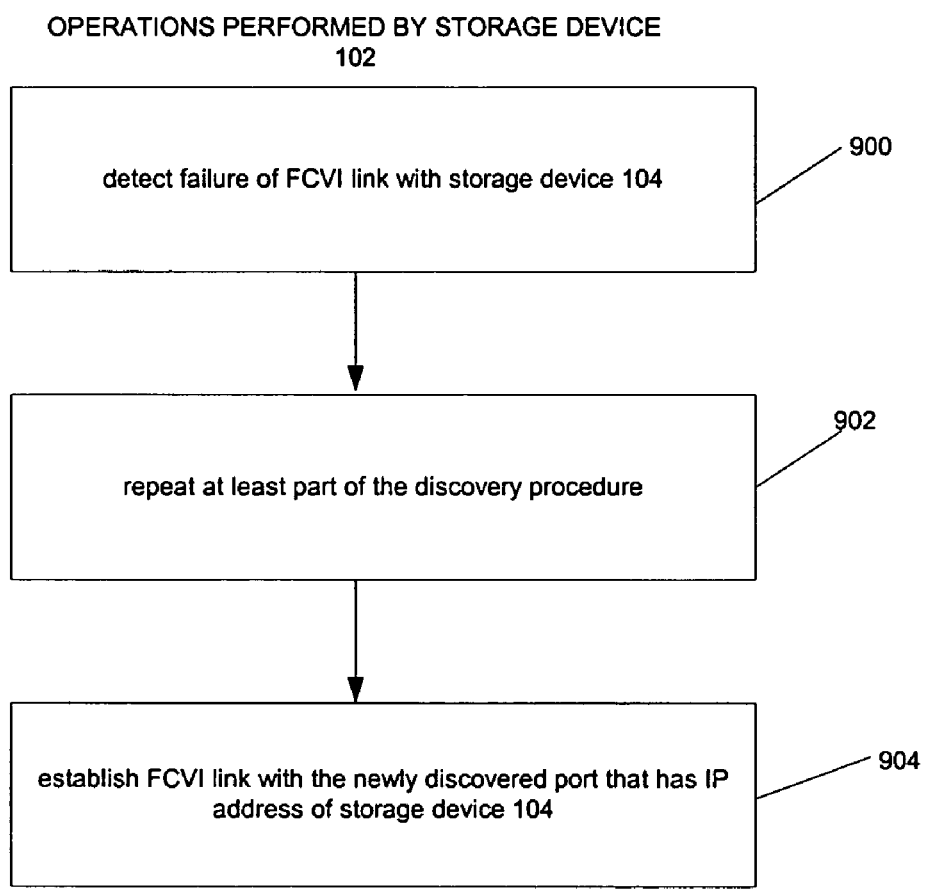
FIGS. 9A and 9B show flow charts of operations performed by the storage device 102 after failure, in accordance with one embodiment of the invention.

Referring now to FIG. 9A of the drawings, the operations performed by the storage device 102 in accordance with one embodiment of the invention after failure of the FCVI primary link between the nodes NP1 and NP2 is shown. Starting at block 900, the storage device 102 detects the failure of the primary FCVI link with the storage device 104. The failure of the primary FCVI link may be detected by the receipt of a transport layer error, or by receipt of an event notification from the name server 108A. If an event notification is received from the name server 108A, then the storage device 102 queries the name server to determine all ports that are currently active on the fabric 108. If the port NP2 which was previously active on the fabric is no longer active, then storage device 102 will determine that the port NP2 has failed. After execution of block 900, block 902 executes, wherein the storage device 102 repeats at least part of the discovery procedure described with reference 7A and 7B of the drawings. For example, in one embodiment, all the operations shown in 7A may be performed by the storage device 102. Alternatively, only operations 704 and 704 in FIG. 7A, or 704 and 706 in FIG. 7B may be performed.

Figure 9B:
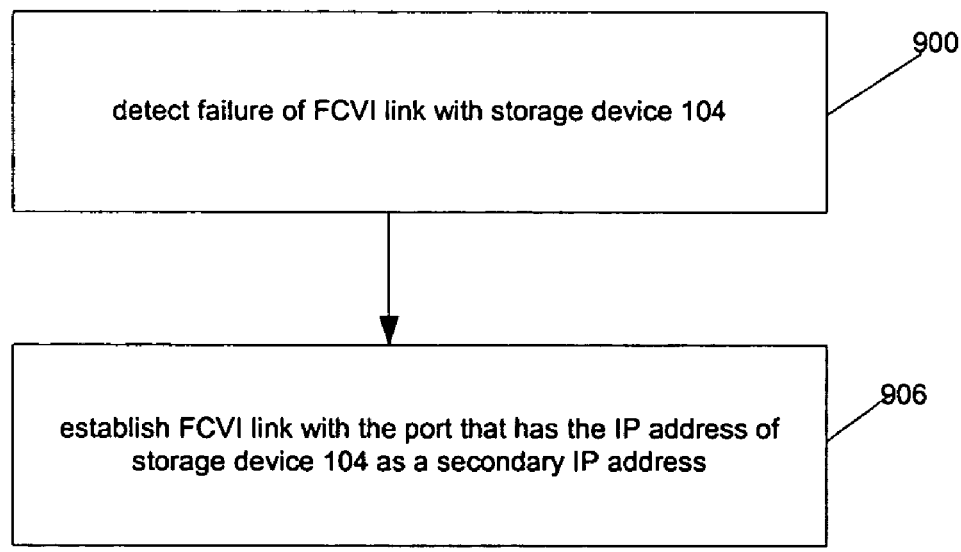

Referring now to FIG. 9B of the drawings, there is shown a sequence of alternative operations performed by the storage device 102, after failure of the primary FCVI link between the nodes NP1 and NP2 occurs. Referring to FIG. 9B of the drawings, the block 900 described with reference to FIG. 9A of the drawings is repeated. Thereafter, a block 906 is performed, wherein the storage device 102 establishes an FCVI link with the port that has the IP address of the storage device 104 encoded within its symbolic name as a secondary address. In the alternative operations shown in FIG. 9B of the drawings, the re-registration of the symbolic name assigned to the port NP3 described in FIG. 8 is not required.

Figure 1B:
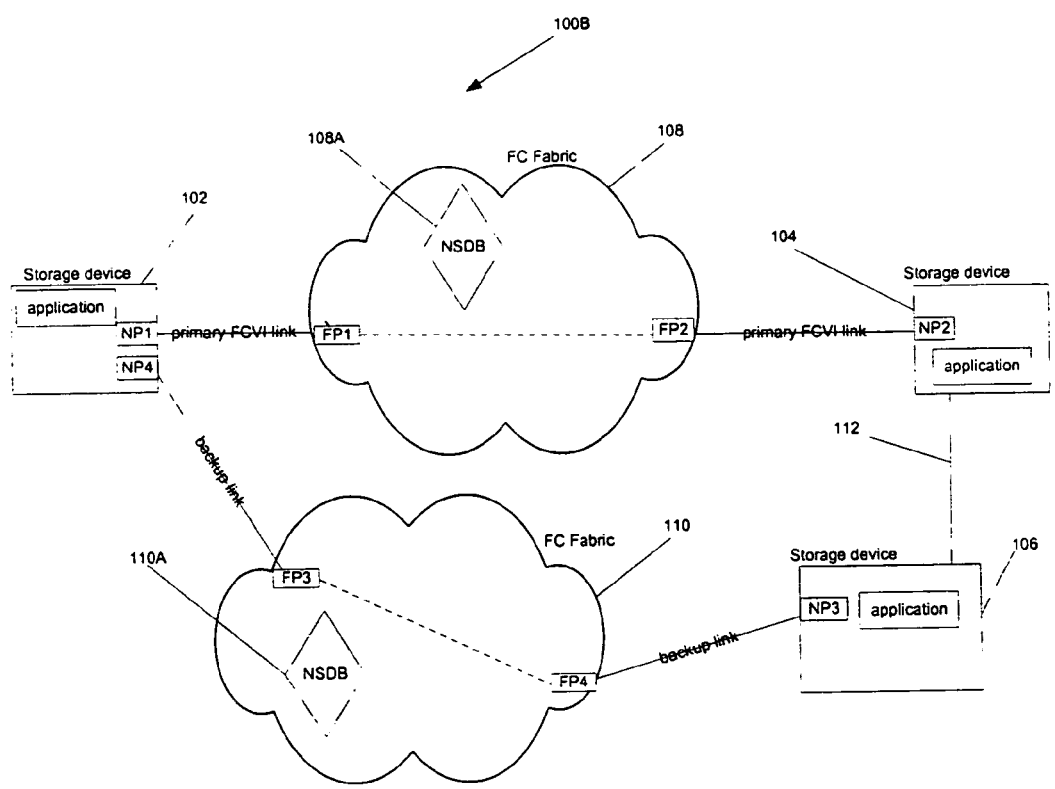

FIG. 1B of the drawings shows a block diagram of a SAN 100B, which is similar to the SAN 100A, except that two separate fabrics 108 and 110 are used to connect the storage devices 102, 104, and 106. A primary FCVI link is created between the port NP1 of the storage device 102 and the port NP2 of the storage device 104 through the fibre channel fabric 108. The storage device 104 has an IP address 1.1.1.3, and the storage device 106 is assigned the IP address 2.2.2.4 as a primary IP address, and the IP address 1.1.1.3 as a backup IP address. Thus, the storage devices 104 and 106 form a failover cluster in which the storage device 106 is a failover partner for the storage device 104. The storage device 106 is connected to the fabric 110 through an F_Port FP4. Before failure of the primary FCVI link between the storage device 102 and the storage device 104 occurs, the storage device 106 registers its primary IP address, which is encoded within a symbolic name for the storage device 106, with a name server 110A for the fabric 110. A private point-to-point link 112 enables communications between the storage device 104 and the storage device 106 independently of the fabrics 108 and 110. When failure of the primary link between the storage devices 102 and 104 occurs, the storage device 104 notifies the storage device 106 of the failure through the private link 112 of the failure. In one embodiment, the link 112 may be used by the storage device 104 to send messages to the storage device 106. These messages are to let the device 106 know that the device 104 is operational. Thus, the messages form a "heartbeat" for the device 104 such that failure of the device 104 may be detected by the device 106 through the absence of the messages. The storage device 106 responds to the notification or absence of the "heartbeat" by re-registering its symbolic name with the name server 110A with the backup IP address 1.1.1.3 encoded therein, in accordance with the techniques described above. Thereafter, the storage device 102 performs a discovery operation, as described above, in order to discover the identity of the port that has been assigned the IP address 1.1.1.3. As a result of this discovery process, the storage device 102 discovers that the port NP3 on the storage device 106 has been assigned an IP address 1.1.1.3. The storage device 102 then establishes an FCVI link with the port NP3 using a separate port NP4. As will be seen, the FCVI link between the ports NP4 and NP3 are completely independent of the ports NP1 and NP2 and the fabric 108 and is thus preferable in disaster recovery applications.

Figure 10:
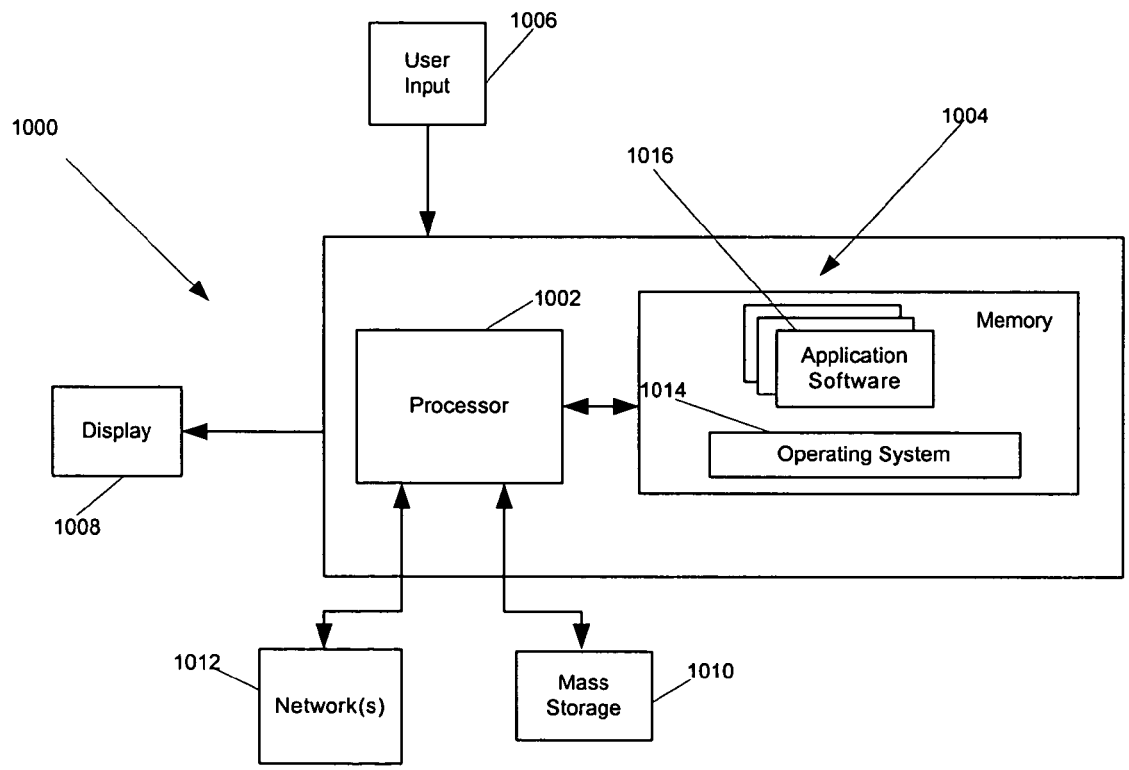
FIG. 10 shows a high-level block diagram of hardware that could be used to implement the storage devices 102, 104, and 106, in accordance with one embodiment of the invention.

Referring to FIG. 10 of the drawings, reference numeral 1000 generally indicates hardware that may be used to implement the storage devices 102, 104, and 106 in accordance with one embodiment. The hardware 1000 typically includes at least one processor 1002 coupled to a memory 1004. The processor 1002 may represent one or more processors (e.g., microprocessors), and the memory 1004 may represent random access memory (RAM) devices comprising a main storage of the hardware 1000, as well as any supplemental levels of memory e.g., cache memories, non-volatile or back-up memories (e.g. programmable or flash memories), read-only memories, etc. In addition, the memory 1004 may be considered to include memory storage physically located elsewhere in the hardware 1000, e.g. any cache memory in the processor 1002, as well as any storage capacity used as a virtual memory, e.g., as stored on a mass storage device 1010.

The hardware 1000 also typically receives a number of inputs and outputs for communicating information externally. For interface with a user or operator, the hardware 1000 may include one or more user input devices 1006 (e.g., a keyboard, a mouse, etc.) and a display 1008 (e.g., a Cathode Ray Tube (CRT) monitor, a Liquid Crystal Display (LCD) panel).

For additional storage, the hardware 1000 may also include one or more mass storage devices 1010, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 1012 (e.g., a local area network (LAN), a wide area network (WAN), a wireless network, and/or the Internet among others) to permit the communication of information with other computers coupled to the networks. It should be appreciated that the hardware 1000 typically includes suitable analog and/or digital interfaces between the processor 1002 and each of the components 1004, 1006, 1008 and 1012 as is well known in the art.

The hardware 1000 operates under the control of an operating system 1014, and executes various computer software applications 1016, components, programs, objects, modules, etc. (e.g. a program or module which performs operations described with reference to FIGS. 1-9 of the drawings). Alternatively, the operating system and the applications may be embodied in one piece of software. Moreover, various applications, components, programs, objects, etc. may also execute on one or more processors in another computer coupled to the hardware 1000 via a network 1012, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to storage type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for building a failover-enabled communications link, comprising:

receiving, by a first Fibre Channel (FC) storage device, input of a plurality of upper-level addresses, based on an upper-level protocol, assigned to a FC port of the first FC storage device, the first FC storage device supporting the FC protocol at a base layer, wherein the plurality of upper-level addresses includes a primary address and a backup address, wherein the backup address is associated with a second FC storage device;

registering, by the first FC storage device, a symbolic name for the FC port of the first FC storage device with a name server, wherein a symbolic name field is encoded with the plurality of upper-level addresses including the primary address, and the backup address associated with the second FC storage device, wherein the symbolic name is encoded with the primary address and the backup address based on a predefined encoding scheme that includes using selected bytes in the symbolic name field defined in the FC protocol to store the primary address and the backup address;

detecting, by the first FC storage device, a link failure between the second FC storage device and a third FC storage device;

determining, by the first FC storage device, the backup address based on the position of the backup address within the symbolic name field; and linking, by the first FC storage device, the FC port of the first FC storage device over a fabric network to the third FC storage device using the backup address determined from the symbolic name field.

2. The method of claim 1, wherein the upper-level protocol is a network protocol.

3. The method of claim 2, wherein the network protocol is the Transmission Control Protocol over the Internet Protocol (TCP/IP), and the upper-level addresses are IP addresses.

4. The method of claim 1, wherein registering the symbolic name for the FC port of the first FC storage device with the name server comprises:
  sending a RFT_ID message to the name server for a FC fabric that enables communications between the FC storage devices; and
  sending a RSPN_ID message to the name server.

5. The method of claim 1, wherein linking the FC port of the first FC storage device over a fabric network to the third FC storage device comprises:
  sending, by the third FC storage device, a GID_FT message to the name server;
  sending a GSPN_ID message to the name server for each port identified in a response to the GID_FT message received from the name server;
  comparing the upper-level address with the addresses encoded in a symbolic name received in response to the GSPN_ID message from the name server; and
  mapping the upper-level address to a port ID of the FC node device that has the upper-level address encoded in its symbolic name.

6. A storage device, comprising:
  a processor;
  a memory coupled to the processor, the memory storing instructions which when executed by the processor cause the storage device to perform a method comprising:
    receiving input of a plurality of IP addresses to be associated with a first Fibre Channel (FC) N_Port of the storage device, the storage device supporting the FC protocol at a base layer, wherein the plurality of IP addresses includes a primary IP address and a backup IP address, wherein the backup IP address is associated with a second FC N_Port on a second storage device;
    registering, with a name server, the plurality of IP addresses as a symbolic name for the first FC N_Port of the storage device within a symbolic name field, wherein the symbolic name field is encoded with the plurality of IP addresses including the primary IP address, and the backup IP address associated with the second FC N_Port on the second storage device, wherein the symbolic name is encoded with the primary IP address and the backup IP address based on a predefined encoding scheme that includes using selected bytes in the symbolic name field defined in the FC protocol to store the primary IP address and the backup IP address;
    detecting, by the storage device, a link failure between the second storage device and a third storage device;
    determining the backup IP address based on the position of the backup IP address within the symbolic name field; and
    linking the first FC N_Port of the storage device over a fabric network to the third storage device using the backup IP address determined from the symbolic name field.

7. The storage device of claim 6, wherein the method further comprises registering each communications protocol supported by the first FC N_Port with the name server for a FC fabric to which the first FC N_Port is connected.

8. The storage device of claim 6, wherein registering with the name server the symbolic name encoded with a primary IP address, and a backup IP address associated with a second FC N_Port on a second storage device comprises a first registration operation to register the primary IP address, and a second registration operation to register the backup IP address.

9. The storage device of claim 8, wherein the first registration operation and the second registration operation are the same registration operation.

10. The storage device of claim 8, wherein the method further comprises detecting a failure of a primary link between a pair of remote N_Ports, wherein one of the remote N_Ports has the backup IP address as a primary IP address.

11. The storage device of claim 10, wherein the second registration operation is performed after detecting the failure.

12. A non-transitory computer readable storage medium, having stored thereon on a sequence of instructions which when executed by a processor for a storage device, causes the storage device to perform a method comprising:
  receiving input of a plurality of IP addresses to be associated with a first Fibre Channel (FC) N_Port of the storage device, the storage device supporting the FC protocol at a base layer, wherein the plurality of IP addresses includes a primary IP address and a backup IP address, wherein the backup IP address is associated with a second FC N_Port on a second storage device;
  registering, with a name server, the plurality of IP addresses as a symbolic name for the first FC N_Port of the storage device within a symbolic name field, wherein the symbolic name field is encoded with the plurality of IP addresses including the primary IP address, and the backup IP address associated with the second FC N_Port on the second storage device, wherein the symbolic name is encoded with the primary IP address and the backup IP address based on a predefined encoding scheme that includes using selected bytes in the symbolic name field defined in the FC protocol to store the primary IP address and the backup IP address;
  detecting, by the storage device, a link failure between the second storage device and a third storage device;
  determining the backup IP address based on the position of the backup IP address within the symbolic name field; and
  linking the first FC N_Port of the storage device over a fabric network to the third storage device using the backup IP address determined from the symbolic name field.

13. The non-transitory computer readable storage medium of claim 12, wherein the method further comprises registering communications protocols supported by the first FC N_Port with the name server for a FC fabric to which the first FC N_Port is connected.

14. The non-transitory computer readable storage medium of claim 12, wherein registering with the name server the symbolic name encoded with a primary IP address, and a backup IP address associated with a second FC N_Port on a second storage device comprises a first registration operation to register the primary IP address and a second registration operation to register the backup IP address.

15. The non-transitory computer readable storage medium of claim 14, wherein the first registration operation and the second registration operation are the same operation.

16. The non-transitory computer readable storage medium of claim 14, wherein the method further comprises detecting a failure of a primary link between a pair of remote N_Ports, wherein one of the remote N_Ports has the backup IP address as a primary IP address.

17. The non-transitory computer readable storage medium of claim 16, wherein the second registration operation is performed after detecting the failure.

* * * * *